No. 667,567. Patented Feb. 5, 1901.
E. D. PAGE.
CONDUIT FOR ELECTRIC WIRES.
(Application filed May 14, 1900.)

(No Model.)

Witnesses:
Edward Rowland
A. D. Morss

Inventor
Emmett D. Page,
By his Attorney
T. P. Bourne

THE NORRIS PETERS CO., PHOTO-LITHO., WASHINGTON, D. C.

UNITED STATES PATENT OFFICE.

EMMETT D. PAGE, OF NEW YORK, N. Y.

CONDUIT FOR ELECTRIC WIRES.

SPECIFICATION forming part of Letters Patent No. 667,567, dated February 5, 1901.

Application filed May 14, 1900. Serial No. 16,594. (No model.)

*To all whom it may concern:*

Be it known that I, EMMETT D. PAGE, of New York city, borough of Brooklyn, State of New York, have invented certain new and useful Improvements in Conduits for Electric Wires, of which the following is a specification.

The object of my invention is to provide a conduit capable of receiving one or more electric wires or the like and adapted to be attached to a wall, ceiling, or the like wherein means are provided for permitting ready access to the wires at substantially all portions of the conduit; and to this end I provide the conduit with a cover made of flexible material, such as a pliable metal strip, and connect the same with the conduit by a slip-joint, so that the cover may be slid along the conduit in a longitudinal direction and can be bent toward or from the conduit while the latter is being covered or uncovered, as necessity may require.

The invention further consists in the novel details of improvement that will be more fully hereinafter set forth and then pointed out in the claims.

Figure 1:
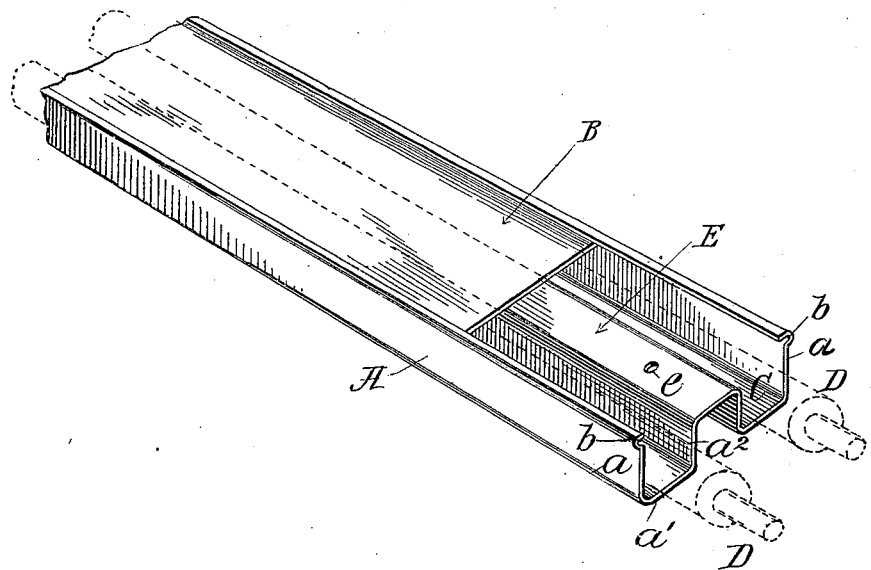
Figure 2:
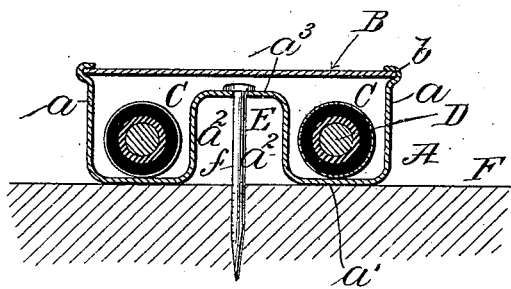

In the accompanying drawings, Figure 1 is a perspective view of a portion of a conduit embodying my invention, the cover being partly drawn back; and Fig. 2 is a cross-section thereof.

The letter A indicates generally my improved conduit, and B is its cover. The conduit shown is substantially of rectangular outline in cross-section and made of sheet metal bent to shape, and its side walls $a$ at their outer edges are folded or bent to provide longitudinally-extending grooves $b$, that face each other and receive the corresponding edges of the cover B, whereby the latter is held upon the conduit so that it may be slid or drawn lengthwise of the same.

While the conduit A may be provided with a single channel or duct, I have shown the same as having two substantially parallel channels or ducts C to receive the electric wires D, (shown as covered by insulation,) and said channels are shown as separated by a rib or wall E. In the preferred construction I take a sheet of metal of suitable thickness and length and bend or roll the same to provide the outer or side walls $a$, the bottom or back walls $a'$, the inner walls $a^2$, and the transverse wall $a^3$, the walls $a^2$ and $a^3$ thus forming the intermediate wall or rib E that separates the wires D. By the construction described the metal of the conduit is greatly stiffened, so that comparatively thin metal can be used. By not having the wall $a^3$ project as far as the grooves $b$ the cover B can be made from a flat strip of metal without requiring it to be bent in line with the rib or wall E. The latter may be provided with any suitable number of apertures $e$ to receive nails, screws, or the like $f$ for holding the conduit against a support F, such as a wall, ceiling, or the like. Where more than two channels or ducts C are provided in a conduit, the metal strip may be bent into a suitable number of ribs or walls E, as will be clearly understood. The conduit may be made in suitable lengths or sections, which may be arranged consecutively end to end for the required distance.

I preferably form the cover B of a suitable pliable or flexible metal strip, whereby as the latter is withdrawn from the conduit by sliding it through the grooves $b$ it may be bent outwardly as it passes from the grooves, so as to enable it to be conveniently manipulated in long lengths and so as not to be obstructed in its passage by an adjacent wall, floor, ceiling, or the like. I also preferably make the conduit of pliable metal, so that the webs of the grooves $b$, that overlie the cover, can be bent outwardly at any desired points to permit the cover or part of the cover to be withdrawn at such points, and so not requiring the cover to be withdrawn or applied at the end of any particular section of the conduit. Furthermore, by having a flexible or pliable cover, as stated, the same may be readily applied to the conduit when the latter is attached to a support by bending it to a suitable shape, entering its ends in the groove $b$, and then drawing or pushing the same along the grooves, while at the same time gradually bending the same straight at the point of entrance into the grooves. If desired, the pliable cover may be rolled, as on a core, whereby when it is to be applied to the conduit it can be unrolled and straightened close to the grooves $b$ as it is fed or drawn into place on the conduit. The cover can also be rolled as it is withdrawn from the conduit. It will thus be seen that the cover can be readily attached to, held upon, and detached from the conduit through the medium of its grooves $b$ without the use of screws, strips, or other separable parts.

By making the conduit and its cover of metal the same can be utilized as a grounded conductor in conjunction with one or more of the contained wires, and it can also be electrically connected with interior metal tubes containing feed-wires as in common use, whereby a grounded circuit over such conduit and tubes can be established. The conduit and its cover may be covered with insulating-paint or its equivalent in a well-known manner.

Where wires are to be carried around corners or at an angle, two adjacent conduits can readily be cut to form a miter-joint and secured together by lapping, solder, or the like, and the adjacent ends of the corresponding covers similarly cut, or any other suitable form of elbow or joint can be provided.

Further advantages of my improved conduit are that it protects a building from fire caused by overheating of the contained wires, any portion of said wires can be exposed by drawing back the cover, the parts are not liable to become detached, and the conduit is capable of ready application to a support, is simple to operate in applying or transferring wires or making electrical connections with the same, and cheap to manufacture.

Having now described my invention, what I claim is—

1. A conduit having one or more channels or ducts for wires or the like and provided with a pliable detachable cover adapted to be bent laterally relatively to its length, and means for holding the cover upon the conduit, substantially as described.

2. A conduit having one or more channels or ducts for wires or the like and provided with a pliable detachable cover adapted to be bent toward and away from the conduit, and also having longitudinally-extending grooves whereby the cover may be slid along the conduit to apply and detach the same, substantially as described.

3. A conduit having one or more channels or ducts for wires or the like and provided with a pliable detachable cover adapted to be bent at an angle to the plane of the conduit, said conduit having grooves provided with longitudinally-extending webs that overlie the cover and are adapted to be bent outwardly to permit the cover to be withdrawn laterally from the grooves, substantially as described.

4. A conduit made from a strip of sheet metal bent to form side walls and an intermediate rib forming channels or ducts, a pliable cover adapted to be bent toward and away from the conduit, and means for detachably connecting the cover with the conduit, substantially as described.

5. A conduit made from a strip of sheet metal bent to form side walls and grooves $b$ at the edges of said walls, and bent intermediate said walls to form a rib to provide channels or ducts, and a pliable cover adapted to be bent toward and away from the conduit and adapted to fit said grooves, substantially as described.

6. A conduit made from a strip of sheet metal bent to form side walls provided with grooves having longitudinally-extending pliable webs, and a cover adapted to fit said grooves, said webs being adapted to be bent outwardly to permit the cover to be withdrawn from the grooves, substantially as described.

7. A conduit made from a strip of sheet metal bent to form substantially parallel side walls $a$, bottom walls $a'$, and intermediate walls $a^2$ connected together whereby channels or ducts are formed, the walls $a$ being bent to form longitudinally-disposed grooves that have inner and outer webs projecting laterally from the walls, the outer webs that overlie the cover being adapted to be bent outwardly to permit the cover to be withdrawn, and a cover adapted to fit in said grooves, substantially as described.

EMMETT D. PAGE.

Witnesses:
T. F. BOURNE,
A. R. ANGUS.